United States Patent Office 2,930,730
Patented Mar. 29, 1960

2,930,730
FUNGICIDAL COMPOSITIONS COMPRISING NITROGEN BASE SALTS OF DIMETHYL-TETRATHIOPHOSPHORIC ACID

Carleton B. Scott, Pomona, Calif., assignor, by mesne assignments, to Collier Carbon and Chemical Corporation, a corporation of California No Drawing. Application May 21, 1956
Serial No. 585,970

12 Claims. (Cl. 167—22)

This invention relates to fungicidal compositions comprising certain nitrogen base salts of dimethyl-tetrathiophosphoric acid as the essential active ingredient.

The fungicidal compounds which constitute the essential active ingredient in the compositions of the present invention are defined by the general formula

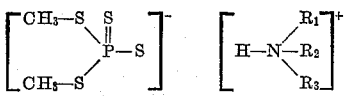

wherein $R_1$ represents hydrogen, alkyl, cycloalkyl, aryl, aralkyl or alkaryl, and $R_2$ and $R_3$ each represents hydrogen, alkyl, cycloalkyl, aryl, aralkyl, or alkaryl, or together represent a carbocyclic or heterocyclic ring. Thus, the nitrogen bases which form the present class of salts with dimethyl-tetrathiophosphoric acid comprises ammonia itself; primary amines of the formula $XNH_2$, wherein X represents alkyl, aryl, cycloalkyl, aralkyl or alkaryl, e.g., methylamine, butylamine, laurylamine, naphthylamine, toluidine, benzylamine, etc.; secondary amines of the formula XYNH, wherein X and Y each represents alkyl, aryl, cycloalkyl, aralkyl or alkaryl, e.g., diethylamine, di-octylamine, methylethylamine, dicyclohexylamine, diphenylamine, N-methylaniline, di-phenylamine, etc.; tertiary amines of the formula XYZN, wherein X, Y and Z each represents alkyl, aryl, cycloalkyl, aralkyl or alkaryl, e.g., triethylamine, trihexylamine, triphenylamine, methyl dicyclohexylamine, N,N-dimethylaniline, tri-p-ethylphenylamine, etc.; heterocyclic nitrogen bases of the formula A>NH, wherein A represents a carbocyclic or heterocyclic nucleus, e.g., pyridine, picoline, quinoline, morpholine, pyrimidine, pyrrolidine, etc.; and quaternary ammonium bases such as tetramethyl ammonium hydroxide, dimethyl-dibenzyl ammonium hydroxide, triethyl phenylammonium hydroxide, etc. The salts of such amines with dimethyl-tetrathiophosphoric acid are for the most part white crystalline solids which are at least partially soluble in water as well as in common organic solvents such as benzene, toluene, acetone, etc.

The following examples will illustrate the preparation of a number of the members of the present class of fungicidal compounds, but are not to be construed as limiting the invention:

Example 1

One-half gram mole of diethylamine was dissolved in 100 ml. of benzene and was added gradually to 0.5 gram mole of dimethyl-tetrathiophosphoric acid dissolved in 100 ml. of benzene. During admixture of the two solutions the temperature of the mixture was held at 20°–26° C. by immersing the reaction vessel in a water bath. The mixture was then diluted with several volumes of diethyl ether, whereupon a white crystalline product was precipitated. The crystals were dissolved in chloroform and again precipitated with diethyl ether, whereby there was obtained 50 grams of the diethylamine salt of dimethyl-tetrathiophosphoric acid in the form of white needles, M.P.=81° C. The analysis was as follows:

|              | Percent N | Percent P |
| ------------ | --------- | --------- |
| Calculated   | 5.3       | 11.8      |
| Found        | 5.5       | 11.7      |

Example 2

The procedure of Example 1 was repeated, employing 0.25 gram mole of dimethyl-tetrathiophosphoric acid dissolved in 30 ml. of benzene and 0.25 gram mole of beta-picoline dissolved in 30 ml. of benzene. During admixture of the two reactants the temperature was held at 10°–20° C. After working up the product as described in Example 1 there was obtained 50 grams of the beta-picoline salt of dimethyl-tetrathiophosphoric acid in the form of white needles, melting at about 73° C. and having the following analysis:

|              | Percent N | Percent P |
| ------------ | --------- | --------- |
| Calculated   | 4.9       | 11.0      |
| Found        | 5.2       | 11.0      |

Example 3

Example 2 was repeated, substituting alpha-picoline for the beta-picoline. The alpha-picoline salt of dimethyltetrathiophosphoric acid was obtained as a heavy nondistillable oily liquid.

Example 4

Example 2 was repeated, substituting gamma-picoline for the beta-picoline. The gamma-picoline salt of dimethyltetrathiophosphoric acid was obtained as a white crystalline product melting at about 73° C.

Example 5

The quinoline salt of dimethyl-tetrathiophosphoric acid was obtained as white needle-like crystals, M.P.=about 62° C., by reacting quinoline with dimethyl-tetrathiophosphoric acid as described in Example 2.

Example 6

The procedure of Example 2 was employed to obtain the morpholine salt of dimethyl-tetrathiophosphoric acid in the form of oily crystals melting at 108°–115° C.

Example 7

The piperidine salt of dimethyl-tetrathiophosphoric acid was obtained as a white crystalline product melting at 118°–124° C. by the procedure described in Example 2.

Example 8

Equimolecular amounts of dimethyl-tetrathiophosphoric acid and triethylamine in benzene solution were admixed with stirring at 15°–20° C., and the benzene was then removed by gas stripping at 60° C. The triethylamine salt of dimethyl-tetrathiophosphoric acid was obtained in the form of white crystals melting at about 82° C. and having the following analysis:

|              | Percent N | Percent P |
| ------------ | --------- | --------- |
| Calculated   | 4.8       | 9.8       |
| Found        | 4.9       | 9.8       |

Example 9

Gaseous ammonia was bubbled through 0.5 gram mole of dimethyl-tetrathiophosphoric acid at 15°–20° C. until the gas was no longer absorbed. The crystalline solid which was thereby formed was filtered off and washed with diethyl ether, whereby there was obtained 79 grams of ammonium dimethyl-tetrathiophosphate as a white crystalline salt melting with decomposition at about 185° C. The analysis was as follows:

|  | Percent N | Percent P |
|---|---|---|
| Calculated | 5.2 | 16.1 |
| Found | 5.4 | 16.3 |

Example 10

Approximately 0.6 gram mole of pyridine dissolved in benzene was added gradually to 0.5 gram mole of dimethyl-tetrathiophosphoric acid in benzene solution, after which the benzene was evaporated off under vacuum. There was thus obtained 88 grams of the pyridine salt of dimethyl-tetrathiophosphoric acid as a white crystalline solid melting at about 108° C.

Example 11

A solution of 0.76 mole of trimethylamine in 100 ml. of diethyl ether was added gradually with stirring to a solution of 0.5 mole of dimethyl-tetrathiophosphoric acid in 100 ml. of benzene while maintaining a temperature of 20°–25° C. The benzene and ether were then evaporated off at 40° C. under 1 mm. pressure to obtain the trimethylamine salt of dimethyl-tetrathiophosphoric acid as a mass of white crystals melting at about 97° C.

As will be apparent from the preceding examples, the reaction by which the present fungicidal compounds are formed takes place spontaneously upon admixture of the two reactants at atmospheric temperature and in substantially equimolecular proportions. If desired, an excess of the nitrogen base reactant may be provided to insure complete consumption of the dimethyl-tetrathiophosphoric acid reactant. The reaction is most conveniently carried out in the presence of an inert reaction solvent such as benzene, toluene, and the like, and the reaction temperature is preferably held below about 100° C. Upon completion of the reaction, the solvent is distilled or evaporated off to recover the desired product in a form sufficiently pure for use in preparing the fungicidal compositions described below. If desired, the product may be further purified by fractional crystallization, etc.

The fungicidal compositions of the present invention are prepared by combining one or more of the present class of salts with a liquid or solid inert carrier in the conventional manner. Thus, one or a mixture of such salts may be dispersed in water with the aid of a dispersing agent to form a concentrate composition which is subsequently diluted with water to form a spray suitable for application to living plants, lumber and other materials subject to fungus attack. Alternatively, the products may be admixed with an inert solid diluent such as talc, starch, diatomaceous earth, aluminum silicate, etc. to form dusting compositions which can be employed as such or dispersed in an aqueous or oleaginous vehicle to form a spray. In general, any of the conventional formulation and application techniques may be applied in employing the present class of fungicidal products, and any of the various known wetting agents, spreaders, sticking agents, diluents, etc. may be employed in combination with such products. The latter are substantially non-phytotoxic and may accordingly be applied to living plants in relatively concentrated form. However, as will be apparent from the test data presented below, the fungicides of the present class are highly effective in very small quantities, and in the interests of economy they are usually applied at concentrations of the order of 50–2000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrates usually contain between about 5 and about 50 percent by weight of the active ingredient and, optionally, small amounts of spreading agents, dispersing agents, and other conventional adjuvants.

The following examples will illustrate the formulation of a number of typical fungicidal compositions comprising members of the present class of salts as the primary toxic agent, but are not to be construed as limiting the invention. The abbreviation "DMT" is employed to designate dimethyl-tetrathiophosphoric acid:

Example 12

|  | Pounds |
|---|---|
| Ammonium salt of DMT | 2.5 |
| Aluminum silicate | 50.0 |
| Powdered blood albumin | 0.3 |

Example 13

|  | Pounds |
|---|---|
| Aniline salt of DMT | 2.5 |
| Powdered blood albumin | 0.3 |
| Water | 50.0 |

The toxic agent and blood albumin are added to the water, and the mixture is then passed through a colloid mill or high speed blender to obtain a concentrate composition which can be diluted 1000:1 with water to obtain a fungicidal spray for application to living plants.

Example 14

|  | Pounds |
|---|---|
| Dibutylamine salt of DMT | 15.0 |
| Benzene | 50.0 |
| Kerosene extract oil | 100.0 |
| Spray oil | 4000.0 |

This composition is suitable for impregnating lumber.

Example 15

|  | Pounds |
|---|---|
| Dicyclohexylamine salt of DMT | 2.5 |
| Water | 50.0 |
| Commercial spreading agent | 0.5 |
| Commercial sticking agent | 0.5 |

The ingredients are mixed in a colloid mill and are thereafter diluted with 2000 gallons of water to obtain a spray composition containing about 100 parts per million of the active ingredient.

Example 16

|  | Pounds |
|---|---|
| Tetramethylammonium salt of DMT | 5.0 |
| Diatomaceous earth | 10,000.0 |
| Commercial sticking agent | 10.0 |
| Benzene | 50.0 |

The ingredients are thoroughly admixed in a ball mill and after the benzene is evaporated is suitable for use as a fungicidal dusting composition.

Example 17

|  | Pounds |
|---|---|
| Alpha-picoline salt of DMT | 10.0 |
| Attapulgus clay | 30.0 |
| "Neoterge" wetting agent | 0.12 |
| "Duponal ME" wetting agent | 0.05 |
| Lignin sulfate suspending agent | 0.12 |

The ingredients are ground together in a ball mill to form a fungicidal wettable powder.

We are aware that the nitrogen base salts of dimethyl-dithiophosphoric acid

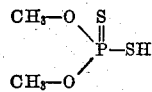

are known and have been indicated to possess insecticidal activities. We have found, however, that insofar as fungicidal properties are concerned the corresponding salts of dimethyl-tetrathiophosphoric acid are unexpectedly superior. In order to demonstrate the fungicidal activity of the latter salts and to compare such activity with that of the corresponding dimethyl-dithiophosphoric acid salts, the following test procedure has been employed: A 2.5-gram sample of the material to be tested and 2 drops of a non-ionic dispersing agent (Triton "X–171" manufactured by Rohm and Haas Co.) are added to sufficient distilled water to make 100 grams and the mixture is homogenized for 3 minutes in a high-speed blender. With the blender still operating, a 3-gram sample of the liquid is removed and is stirred into 75 grams of liquid potato dextrose agar at 45° C., and the agar is transferred to a Petri dish. The agar so prepared contains 1000 p.p.m. of the material to be tested. If lower concentrations, e.g., 10 or 100 p.p.m., are to be tested, 1-gram portions of the concentrate composition in the blender are diluted with agar accordingly. The agar is allowed to cool to room temperature, whereupon it solidifies, and a ¼" disk of the test fungus inoculum is placed on the surface of the agar. The inoculated agar is incubated at room temperature for two days, after which the extent of fungus growth is measured and the percent inhibition of fungus growth is calculated by the formula:

$$100 - \frac{\text{Growth on test sample}}{\text{Growth on blank}} \times 100$$

The following tabulation presents inhibition values obtained by subjecting a number of the fungicidal compounds of the present invention and their corresponding dithio analoges to the foregoing test procedure, employing a variety of test organisms. The abbreviation "DMT" and "DMD" refer to dimethyl-tetrathiophosphoric acid and dimethyl-dithiophosphoric acid, respectively:

| Test Compound | | Percent Inhibition | | | | | | | | |
|---|---|---|---|---|---|---|---|---|---|---|
| Identity | Conc., p.p.m. | R. solani | S. rolfsii | P. cinnamomi | P. ultimum | S. sclerotiorum | S. fructicola | B. cinerea | A. solani | Average for all Organisms |
| alpha-Picoline salt of DMT | 100 | 100 | 100 | 100 | 100 | 100 | 97.4 | 50.0 | 75.0 | 90.3 |
| Do | 1,000 | 100 | 100 | 100 | 100 | 100 | 100 | 100 | 100 | 100 |
| alpha-Picoline salt of DMD | 100 | 4.0 | 7.0 | 10.0 | 1.0 | 7.6 | 20.0 | 0 | 24.5 | 8.3 |
| Do | 1,000 | 55.7 | 57.2 | 100 | 100 | 30.0 | 76.0 | 13.5 | 41.2 | 59.2 |
| Quinoline salt of DMT | 100 | 83.0 | | | 86.2 | 96.6 | 77.2 | 61.0 | 69.3 | 78.8 |
| Do | 1,000 | 100 | 100 | 100 | 100 | 100 | 100 | 100 | 100 | 100 |
| Quinoline salt of DMD | 100 | 18.2 | 28.2 | 71.5 | 20.0 | 5.7 | 40.0 | 0 | 30.0 | 26.7 |
| Do | 1,000 | 81.8 | 50.0 | 100 | 100 | 84.3 | 97.2 | 94.0 | 85.0 | 86.5 |
| Morpholine salt of DMT | 100 | 52.5 | 60.8 | | 82.5 | 56.4 | 68.6 | 87.8 | | 68.1 |
| Do | 1,000 | 100 | 100 | 100 | 100 | 100 | 100 | 100 | 100 | 100 |
| Morpholine salt of DMD | 100 | 13.5 | 8.8 | 36.6 | 14.5 | 0 | 0 | 0 | 0 | 9.2 |
| Do | 1,000 | 94.2 | 47.4 | 90.0 | 78.6 | 13.8 | 37.0 | 0 | 18.6 | 47.4 |
| Piperidine salt of DMT | 100 | 57.7 | 82.5 | 90.0 | 55.4 | 63.1 | 88.0 | 91.1 | 53.0 | 72.6 |
| Do | 1,000 | 100 | 100 | 100 | 100 | 100 | 100 | 100 | 100 | 100 |
| Piperidine salt of DMD | 100 | 15.4 | 7.0 | 20.0 | 26.4 | 0 | 0 | 0 | 0 | 8.6 |
| Do | 1,000 | 83.7 | 56.2 | 90.0 | 83.5 | 27.7 | 88.0 | 0 | 41.2 | 58.8 |
| Ammonium salt of DMT | 100 | 25.0 | 38.0 | | 46.5 | 26.5 | 45.8 | 47.4 | 0 | 32.8 |
| Do | 1,000 | 100 | 100 | | 100 | 100 | 100 | 100 | 100 | 100 |
| Ammonium salt of DMD | 100 | 2.0 | 0 | | 0 | 0 | 0 | 0 | 0 | 0 |
| Do | 1,000 | 30.5 | 41.6 | | 69.0 | 97.1 | 76.2 | 59.7 | 50.0 | 60.6 |
| Triethylamine salt of DMT | 1,000 | 90.4 | 100 | | 100 | 100 | 92.0 | 66.6 | 64.4 | 84.2 |
| Triethylamine salt of DMD | 1,000 | 63.4 | 56.1 | 93.3 | 70.2 | 53.8 | 60.0 | 13.4 | 53.0 | 57.8 |
| Diethylamine salt of DMT | 1,000 | 76.2 | 85.0 | | 93.0 | 87.9 | 83.7 | 93.9 | 80.0 | 85.7 |
| beta-Picoline salt of DMT | 100 | 92.9 | 92.2 | 91.9 | 100 | 100 | 82.9 | | 55.0 | 87.9 |
| Do | 1,000 | 100 | 100 | 100 | 100 | 100 | 100 | 100 | 100 | 100 |
| gamma-Picoline salt of DMT | 100 | 75.0 | 87.5 | 81.8 | 91.9 | 97.1 | 69.6 | | 50.0 | 78.9 |
| Do | 1,000 | 100 | 100 | 100 | 100 | 100 | 100 | 100 | 100 | 100 |
| Pyridine salt of DMT | 1,000 | 100 | 100 | 100 | 100 | 100 | 100 | 100 | 100 | 100 |
| Trimethylamine salt of DMT | 1,000 | 100 | 100 | 100 | 100 | 100 | 100 | 100 | 100 | 100 |
| "Captan"[1] | 100 | | | | | | | | | 74 |
| Do,[1] | 1,000 | | | | | | | | | 90 |
| "PCNB"[1] | 100 | | | | | | | | | 74 |
| Do,[1] | 1,000 | | | | | | | | | 91 |
| "Phygon"[1] | 100 | | | | | | | | | 59 |
| Do,[1] | 1,000 | | | | | | | | | 83 |
| "Fermate"[1] | 100 | | | | | | | | | 55 |
| Do,[1] | 1,000 | | | | | | | | | 96 |

[1] Common commercial fungicides.

It will be noted that in all instances the nitrogen base salt of dimethyl-tetrathiophoshpric acid was highly superior in fungicidal activity to the corresponding salt of dimethyl-dithiophosphoric acid. Also, in substantially all instances the dimethyl-tetrathiophosphoric acid salt gave 100 percent control of all test organisms at a concentration of 1000 p.p.m. and compared very favorably with a number of well-known and widely used commercial fungicides. It will further be noted that the heterocyclic nitrogen base salts of dimethyl-tetrathiophosphoric acid have appreciably greater fungicidal activity than the simple amine salts; for this reason the heterocyclic salts form a preferred class of the new compounds provided by the invention.

The present class of new compounds is also effective as bactericides. This may be demonstrated by the following test procedure: A concentrate solution or dispersion of the test material is made up as described above in connection with the fungicidal testing procedure, and is added to a standard culture medium consisting of potato dextrose agar, yeast extract, peptone, and calcium carbonate to give the desired concentration. Four samples of the medium so prepared are then inoculated with Erwinia carotovora, Pseudomonas syringae, Agrobacterium tumefaciens, and Xanthomomas juglandis, respectively. After incubation for 2 days, the inoculated media are examined for bacterial growth. The following data were obtained by subjecting a number of the present salts and their dimethyl-dithiophosphoric acid counterparts to such procedure:

| Test Compound | Conc. | Percent Kill of 4 Bacteria Tested |
|---|---|---|
| alpha-Picoline salt of DMT | 100 | 25 |
| Do | 1,000 | 100 |
| alpha-Picoline salt of DMD | 100 | 0 |
| Do | 1,000 | 0 |
| beta-Picoline salt of DMT | 100 | 75 |
| Do | 1,000 | 100 |
| gamma-Picoline salt of DMT | 100 | 75 |
| Do | 1,000 | 100 |
| Quinoline salt of DMT | 100 | 75 |
| Do | 1,000 | 100 |
| Quinoline salt of DMD | 100 | 0 |
| Do | 1,000 | 75 |
| Morpholine salt of DMT | 100 | 25 |
| Do | 1,000 | 75 |
| Morpholine salt of DMD | 100 | 0 |
| Do | 1,000 | 0 |
| Triethylamine salt of DMT | 100 | 0 |
| Do | 1,000 | 50 |
| Triethylamine salt of DMD | 100 | 0 |
| Do | 1,000 | 0 |

Other modes of applying the principle of my invention may be employed instead of those explained, change being made as regards the methods or materials employed provided the products stated by any of the following claims, or the equivalent of such stated products, be obtained.

I, therefore, particularly point out and distinctly claim as my invention:

1. A fungicidal composition comprising as the essential active ingredient a salt of dimethyl-tetrathiophosphoric acid and a nitrogen base compound selected from the class consisting of (1) ammonia, (2) heterocyclic nitrogen bases, (3) primary amines of the formula $XNH_2$, (4) secondary amines of the formula XYNH, and (5) tertiary amines of the formula XYZN, wherein X, Y, and Z each represents a substituent selected from the class consisting of alkyl, aryl, cycloalkyl, aralkyl and alkaryl groups; an inert fungicidal carrier material for said active ingredient; and sufficient of a dispersing agent to enable said active ingredient and said carrier material to be dispersed in water.

2. A composition as defined by claim 1 wherein the said carrier material comprises water and contains sufficient of a dispersing agent to maintain the said active ingredient uniformly dispersed in said water.

3. A composition as defined by claim 1 wherein the said carrier material comprises an inert particulate solid.

4. A fungicidal composition comprising as the essential active ingredient a salt of dimethyl-tetrathiosphophoric acid and a primary amine of the formula:

$$X-NH_2$$

wherein X represents a substituent selected from the class consisting of alkyl, aryl, cycloalkyl, aralkyl and alkaryl groups, an inert fungicidal carrier material for said active ingredient, and sufficient of a dispersing agent to enable said active ingredient and said carrier material to be uniformly dispersed in water.

5. A fungicidal composition comprising as the essential active ingredient a salt of dimethyl-tetrathiophosphoric acid and a secondary amine of the formula:

wherein X and Y each represents a substituent selected from the class consisting of alkyl, aryl, cycloalkyl, aralkyl, and alkaryl groups, an inert fungicidal carrier material for said active ingredient, and sufficient of a dispersing agent to enable said active ingredient and said carrier material to be uniformly dispersed in water.

6. A fungicidal composition comprising as the essential active ingredient a salt of dimethyl-tetrathiophosphoric acid and a tertiary amine of the formula:

wherein X, Y and Z each represents a substituent selected from the class consisting of alkyl, aryl, cycloalkyl, aralkyl, and alkaryl groups, an inert fungicidal carrier material for said active ingredient, and sufficient of a dispersing agent to enable said active ingredient and said carrier material to be uniformly dispersed in water.

7. A fungicidal composition comprising as the essential active ingredient a salt of dimethyl-tetrathiophosphoric acid and a heterocyclic nitrogen base, an inert fungicidal carrier material for said active ingredient, and sufficient of a dispersing agent to enable said active ingredient uniformly dispersed in water.

8. A composition of matter adapted to be diluted with water to form a liquid fungicide comprising water having dispersed therein between about 1 and about 15 percent by weight of a salt of dimethyl-tetrathiophosphoric acid and a heterocyclic nitrogen base, and sufficient of an organic dispersing agent to maintain said salt uniformly dispersed in said water.

9. A solid fungicidal composition adapted to be dispersed in water comprising an intimate mixture of an inert particulate solid fungicidal carrier material, between about 5 and about 50 percent by weight of a salt of dimethyl-tetrathiophosphoric acid and a heterocyclic nitrogen base, and sufficient of an organic dispersing agent to render the composition readily dispersible in water.

10. The method of controlling the growth of fungi on plant materials which comprises applying thereto a fungicidal amount of a composition as defined by claim 1.

11. The method of controlling the growth of fungi on plant materials which comprises applying thereto a fungicidal amount of a composition as defined by claim 2.

12. The method of controlling the growth of fungi on plant materials which comprises applying thereto fungicidal amount of a composition as defined by claim 3.

References Cited in the file of this patent

UNITED STATES PATENTS

| 2,529,303 | McDermott | Nov. 7, 1950 |
| 2,760,937 | McDermott | Aug. 28, 1956 |